(12) United States Patent
Yuan et al.

(10) Patent No.: US 7,590,704 B2
(45) Date of Patent: Sep. 15, 2009

(54) SYSTEMS AND METHODS FOR PROCESSING DYNAMIC CONTENT

(75) Inventors: Chun Yuan, Beijing (CN); Zheng Zhang, Beijing (CN); Yu Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 10/760,441

(22) Filed: Jan. 20, 2004

(65) Prior Publication Data

US 2005/0188048 A1 Aug. 25, 2005

(51) Int. Cl.
*G06F 15/16* (2006.01)
(52) U.S. Cl. .......................... 709/217; 709/208
(58) Field of Classification Search ................ 709/208
See application file for complete search history.

(56) References Cited

U.S. PATENT DOCUMENTS

| | | | |
|---|---|---|---|
| 6,249,844 B1 | 6/2001 | Schloss et al. | |
| 6,584,548 B1 | 6/2003 | Bourne et al. | |
| 6,605,120 B1 | 8/2003 | Fields et al. | |
| 6,615,235 B1 | 9/2003 | Copeland et al. | |
| 6,618,751 B1 | 9/2003 | Challenger et al. | |
| 6,665,705 B1 | 12/2003 | Daniels-Barnes et al. | |
| 6,854,018 B1 * | 2/2005 | Li et al. | 709/240 |
| 6,915,307 B1 * | 7/2005 | Mattis et al. | 707/103 R |
| 7,028,096 B1 * | 4/2006 | Lee | 709/231 |
| 7,051,084 B1 * | 5/2006 | Hayton et al. | 709/219 |
| 7,159,014 B2 * | 1/2007 | Kausik et al. | 709/217 |
| 7,177,900 B2 * | 2/2007 | Ims et al. | 709/201 |
| 7,191,170 B2 * | 3/2007 | Ganguly et al. | 707/2 |
| 7,343,396 B2 * | 3/2008 | Kausik et al. | 709/217 |
| 7,383,348 B2 * | 6/2008 | Seki et al. | 709/232 |
| 7,483,941 B2 * | 1/2009 | Carlson et al. | 709/203 |
| 2002/0007404 A1 * | 1/2002 | Vange et al. | 709/217 |
| 2003/0004998 A1 * | 1/2003 | Datta | 707/513 |
| 2003/0140100 A1 * | 7/2003 | Pullara | 709/203 |
| 2003/0177197 A1 * | 9/2003 | de Bonet et al. | 709/213 |
| 2004/0068579 A1 * | 4/2004 | Marmigere et al. | 709/242 |
| 2004/0098463 A1 * | 5/2004 | Shen et al. | 709/213 |

OTHER PUBLICATIONS

Brabrand, et al., "Language-Based Caching of Dynamically Generated HTML", BRICS, Department of Computer Science, University of Aarhus, pp. 1-18, Jan. 2002.
Datta, et al., "Proxy-Based Acceleration of Dynamically Generated Content on the World Wide Web: An Approach and Implementation", SIGMOD, 12 pages, Jun. 4-6, 2002.
Yuan et al., "Proxy+: Simple Proxy Augmentation for Dynamic Content Processing", Microsoft Research Asia, Institute of Automation, Chinese Academy of Sciences, 12 pages, Sep. 29, 2003.

* cited by examiner

*Primary Examiner*—William C Vaughn, Jr.
*Assistant Examiner*—Thomas Richardson
(74) *Attorney, Agent, or Firm*—Lee & Hayes, PLLC (57) ABSTRACT

Systems and methods for processing dynamic content are described herein. A system receives a request for content that includes an item cached by a proxy. The system issues another request to a content server to generate the other items that are not cached, without disrupting the process workflow of the original request. The system combines the items generated by the content server with the item cached by the proxy and sends the combined content to a destination.

22 Claims, 7 Drawing Sheets

SYSTEMS AND METHODS FOR PROCESSING DYNAMIC CONTENT

TECHNICAL FIELD

The systems and methods described herein relate to Internet content delivery.

BACKGROUND

To attract Internet users, more and more web sites are providing interactive and personalized content. This type of dynamic content is usually generated by a content server based on real-time parameters and provides a better user experience than static content. Typically, each request for dynamic content requires a web server to compute the content in real-time and to transmit the content through one or more networks. The complexity of dynamic content poses special performance and scalability issues for network infrastructure and web site operations. One of these issues relates to content caching.

For static content, content caching involves caching each web page in its entirety and is relatively simple. However, for dynamic content, caching an entire page can result in errors since parts of the page may include dynamically generated items. Some current techniques seek to resolve this problem by caching fragments of a dynamically generated web page. A few of these techniques require locating caching servers near the content server. But these techniques require the majority of a web page with dynamic content to be transmitted over the Internet and still fail to address the problems related to network traffic performance. Other techniques allow edge servers, which are server installed at the edge of the Internet, to cache content in specially formatted web pages. However, these specially formatted web pages significantly reduce the user experience because their formats restrict how dynamically generated content can be presented. Also, since the fragments of these specially formatted pages must be separately requested, the processing workflow and semantics of these web pages will become considerably more complicated.

Thus, there is a need for a dynamic content caching system that effectively improves network traffic performance without unduly complicating system configurations and web page processing workflow.

SUMMARY

The systems and methods described herein are directed at processing dynamic content. In one aspect, a system receives a request for content that includes an item cached by a proxy. The system issues another request to a content server to generate the other items that are not cached, without disrupting the process workflow of the original request. The system combines the items generated by the content server with the item cached by the proxy and sends the combined content to a destination.

In another aspect, a content server in the system generates a cacheable item and metadata associated with the cacheable item based on a request for content. A proxy in the system generates a policy for caching the cacheable item based on the metadata.

DETAILED DESCRIPTION

A system for processing dynamic content is described herein. The described systems and methods are directed at accelerating the delivery of dynamically generated content by caching the content on proxy servers located near the requesters. The system described herein is different from other dynamic content acceleration systems. For example, at least one of the other systems employs edge servers for caching fragments in a web page. The web page must be programmed with directives to identify the cacheable fragments. So, the format of the web page is significantly limited. Also, after receiving a request for a web page, an edge server must request from a content server each fragment in the web page that is not cached. Thus, processing workflow and semantics of the original request must be disrupted and replaced with multiple requests, each for a particular fragment. This disruption of the processing workflow results in additional system complexity and renders sever-side caching mechanisms inoperative.

In contrast, the system and method described herein does not disrupt the original content processing workflow and semantics. Unlike the other systems, the described system adds additional information to a content request to facilitate proxy content caching while maintaining the original processing workflow. Thus, the system can provide proxy content caching without adding significant complexity to an established content delivery framework. The described system can also provide proxy augmentation without disrupting existing caching mechanisms.

Figure 1:
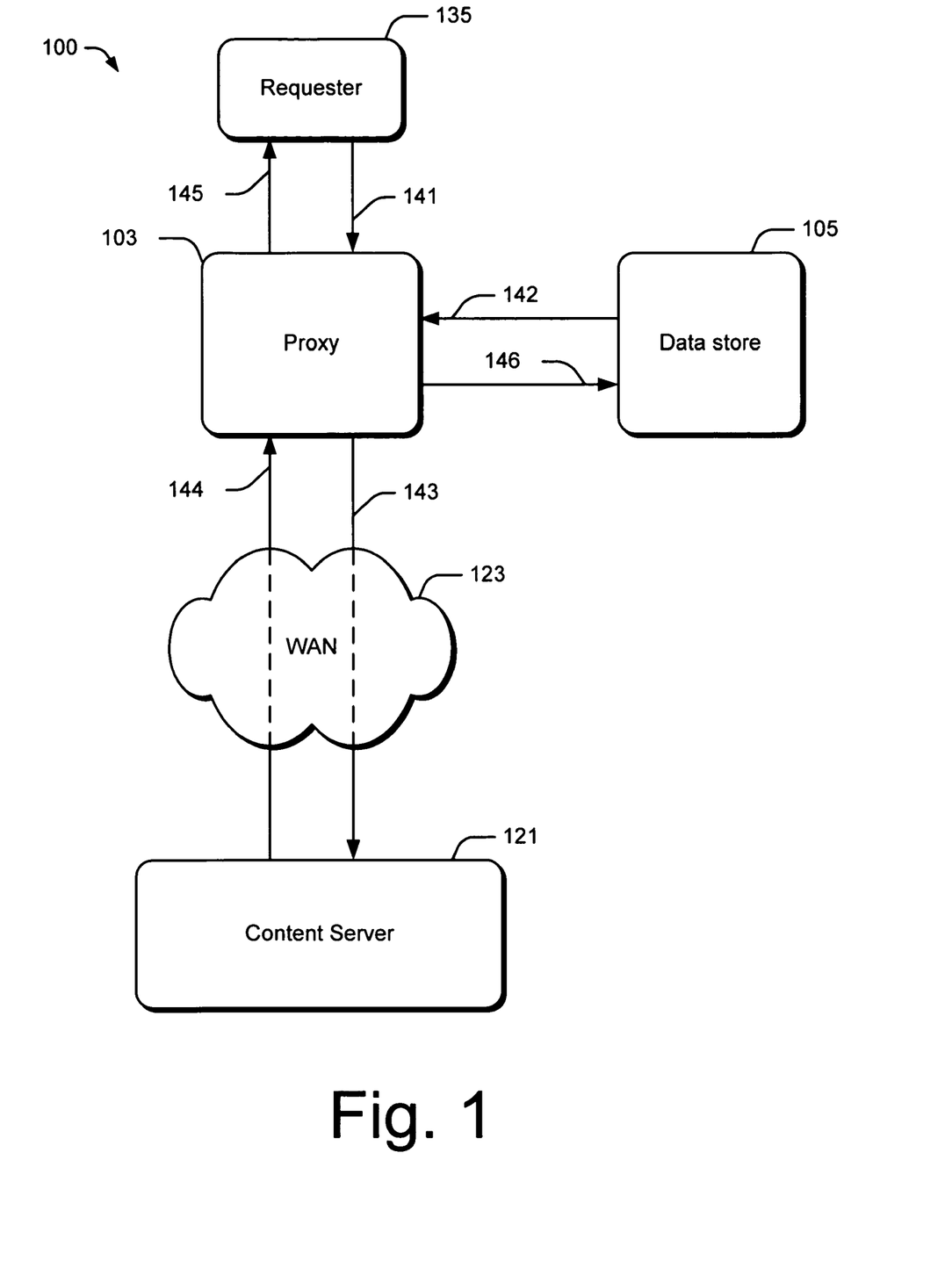
FIG. 1 is a graphical representation of a proxy augmentation system for processing dynamic content.

FIG. 1 is a graphical representation of a proxy augmentation system 100 for processing dynamic content. In the most basic configuration, proxy augmentation system 100 includes a proxy 103 and a content server 121. Proxy 103 is, for example, a computing device configured to handle requests for content managed by content server 121. The content typically contains items that are dynamically generated by content server 121 in real-time. Items in the content associated with a request typically include a web page and one or more fragments. The web page is the framework of the content and the fragments are the substance of the content. Both web pages and fragments may be cached to accelerate content delivery.

Dynamically generated items in the content may or may not be cacheable. Typically, dynamic web pages and fragments may be cached under specific conditions. For example, a web page or a cacheable fragment may be valid for a limited time period and may only be cached during that time period. Also, a web page or a cacheable fragment may only be valid under certain operational conditions and may only be cached when those conditions are met. Typically, information about the conditions for caching a web page or a fragment is sent by content server 121 to proxy 103 along with the actual content. Proxy 103 is configured to delete the caching information before sending the content to a requester 135.

Proxy 103 is configured to receive a request for content from requester 135, which may be a user's computer, another network computer, or some other device capable of communicating with proxy 103. Proxy 103 is also configured to cache content in memory, such as a data store 105. In particular, proxy 103 is configured to store items, such as web pages and fragments, that have been previously handled by proxy 103. Proxy 103 is configured to use those cached items to handle subsequent requests for the same content. Data store 105 may be any type of computer-readable media, such as volatile and non-volatile media, and removable and non-removable media.

Proxy 103 is configured to communicate with content server 121 through a computer network, such as a Wide Area Network (WAN) 123. Specifically, when processing a request for content, proxy 103 is configured to forward the request to content server 121 and to notify the content server 121 about the items associated with the request that are cached by proxy 103. Proxy 103 may be implemented as a computing device, such as a server. Proxy 103 may also be implemented as a network appliance, such as a network filter configured to handle outgoing content requests. WAN 123 may be any type of wide area network, such as the Internet. In alternate embodiments, any type of network or other communication link can be used to communicate information between proxy 103 and content server 121.

Content server 121 is a computing device configured to receive a request for content from proxy 103 and to dynamically generate the content in accordance with the request. The request may notify content server 121 whether the items of the content are cached by proxy 103. Content server 121 is typically configured to avoid generating the items that are cached by proxy 103 to reduce the amount of content that has to be dynamically generated and transmitted to proxy 103. For an item that is not cached by the proxy 103, content server 121 is configured to generate the item and to send information about the conditions for caching the item to proxy 103.

Events 141-146 represent an example workflow of proxy augmentation system 100. The data structures associated with events 141-146 will be discussed in conjunction with FIG. 2. At event 141, proxy 103 receives a request for content from requester 135. Proxy 103 determines whether the items of the content have been cached in data store 105. In particular, proxy 103 makes this determination by computing cache keys, which are identifiers associated with the items. If all of the items are cached in data store 105 and are valid based on their caching policies, at event 142, proxy 103 retrieves the items from data store 105. At event 145, the content is sent to requester 135 without communicating with content server 121.

If the web page or any of its associated fragments is not stored in data store 105 or is not valid, proxy 103 adds the cache keys to the content request. At event 143, proxy 103 sends the request to content server 121.

Upon receiving the request from proxy 103, content server 121 examines the cache keys to determine which items of the request content are cached by proxy 103. Content server 121 generates the items that are not cached by proxy 103. Content server 121 also determines whether the generated items are cacheable and what conditions are appropriate for the items to be cached. In particular, content server 121 generates the needed web page and fragments and includes place holders for the items that are cached by proxy 103. Content server 121 may also include metadata in the content to identify any cacheable web page and fragments and to provide information about the conditions for caching them. At event 144, content server 121 sends the content with the generated items to proxy 103.

Proxy 103 receives the content from the content server 121 and makes modifications required to complete the content. For example, proxy 103 may use a cached web page or add cached fragments to the content at the locations of the place holders. Proxy 103 also deletes the metadata associated with the cacheable items generated by content server 121. At event 145, the content is sent to requester 135. At event 146, proxy 103 caches the items in data store 105 for subsequent requests for the same content. The conditions for caching associated with the items are determined from the metadata and are incorporated in the associated caching policies.

Figure 2:
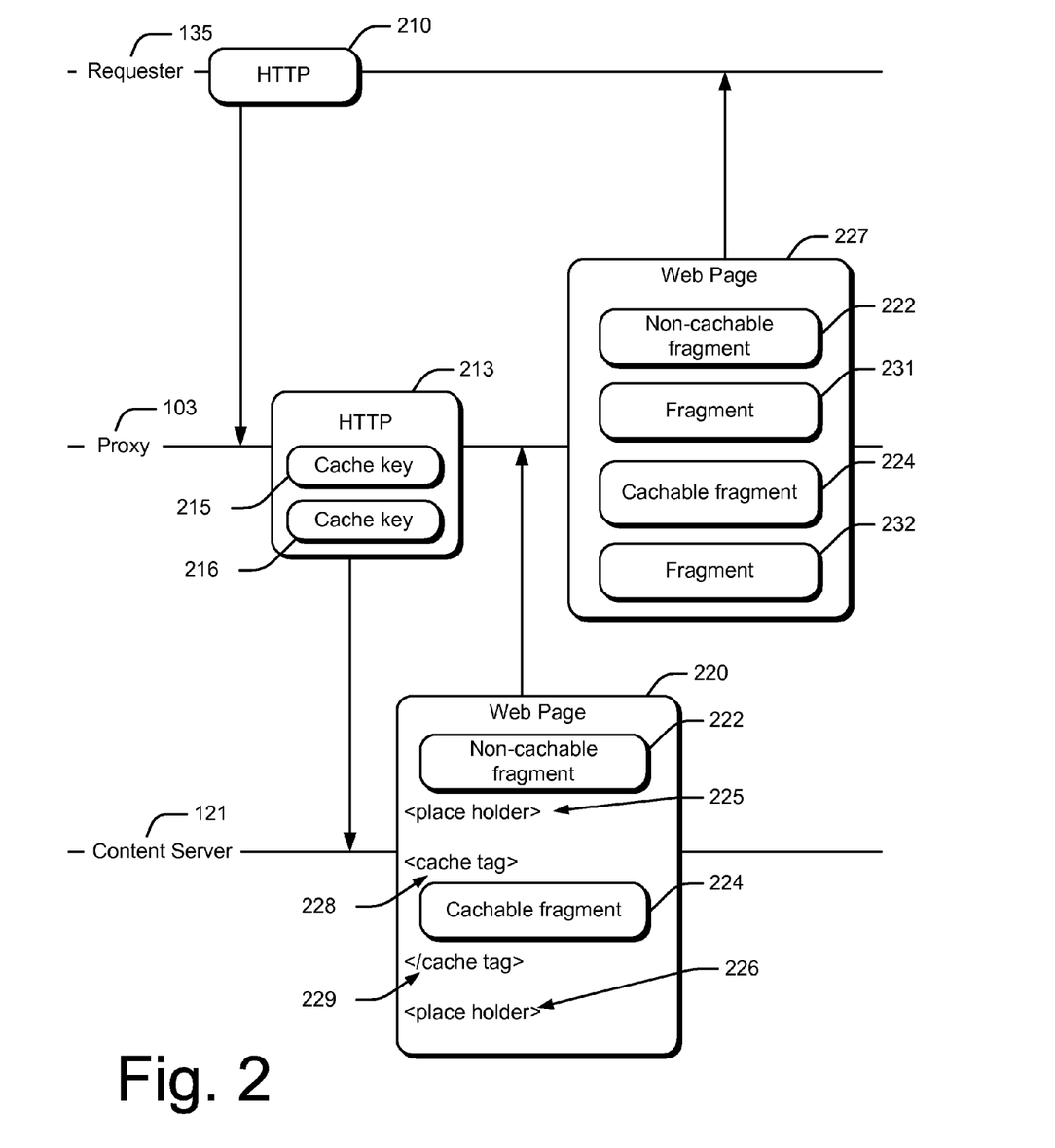
FIG. 2 is a graphical representation of example data structures in communication media that may be implemented by proxy augmentation system.

FIG. 2 is a graphical representation of example data structures in communication media that may be implemented by proxy augmentation system 100. Communication media having these data structures are considered computer-readable media.

Data structure 210 represents a request for content sent by requester 135 to proxy 103. Data structure 210 typically includes a hyper text transfer protocol (HTTP) request for dynamic content managed by content server 121. Data structure 210 may include a uniform resource locator (URL), an Internet Protocol (IP) address, file name, script name and commands, and the like.

Data structure 213 represents a request created by proxy 103 in response to the request in data structure 210. In particular, proxy 103 creates data structure 213 by modifying the request in data structure 210 to include identifiers for the items, such as a web page or fragments, that are associated with the requested content and that are cached by proxy 103. As shown in FIG. 2, two fragments are cached by proxy 103 and are identified by cache keys 215-216. Proxy 103 may also cache the web page and include the associated cache key in the request in data structure 213. Using data structure 213, proxy 103 may consolidate multiple requests for different items of the needed content into a single request.

Data structure 220 represents the content that is dynamically generated by content server 121 in response to the request in data structure 213. Data structure 220 includes the web page and its associated fragments. As shown in FIG. 2, fragments 222 and 224 are generated by content server 121 for the request. Fragment 222 is not cacheable by proxy 103. A fragment may not be cacheable for a variety of reasons, such as security restrictions, short lifetime, caching policies, and the like. Fragment 224 is cacheable, and cache tags 228-229 associated with fragment 224 are included in data structure 220 to identify fragment 224 as cacheable and to provide information about the conditions for caching. In one embodiment, cache tags 228-229 may include cache variation logic (CVL) attributes for computing a cache key for fragment 224.

Data structure 220 may also include place holders for fragments cached by proxy 103 and identified by cache keys in data structure 213. Typically, the place holders are incorporated in the web page as tags. As shown in FIG. 2, place holders 225 and 226 corresponding to cache keys 215-216 are included in data structure 220.

Data structure 227 represents the complete content for responding to the request in data structure 210. Data structure 227 includes the content in data structure 220 modified to include items that are cached by proxy 103. As shown in FIG. 2, data structure 227 includes fragments 231 and 232, which are cached by proxy 103. Fragments 231 and 232 are added to the web page by proxy 103 at the locations identified by place holder 225 and 226. To complete data structure 227, proxy 103 also removes cache tags 228-229 associated with fragment 224. Proxy 103 uses the information in cache tags 228-229 to cache fragment 224 and to compute a cache key associated with the fragment for processing further content requests.

The example data structures shown in FIG. 2 are associated with a situation where only fragments of the requested content are cached. Similar data structures may be generated if the web page of the requested content is cached.

A proxy typically uses a cache key generation algorithm to generate cache keys. In one embodiment, a cache key may be produced by concatenating with semicolons the path name of a web page (or user control) and values associated with the cache key. For example, suppose the page "http://www.petshop.net/Category.aspx" has the following CVL:

```
<%@ OutputCache Duration = "60"
VaryByParam = "category_id"
VaryByHeader = "Accept-Language" %>
```

For a request "http://www.petshop.net/Category.aspx?category_id=cats" and a header field "Accept-Language" of "zh-cn", the cache key is "/Category.aspx;cats;zh-zn".

Also, suppose the CVL of the user control named "header" at "http://www.petshop.net" is as follows:

```
<%@ OutputCache Duration = "60"
VaryByCustom = "userstatus" %>
```

This CVL is intended to show different interface for anonymous users and authenticated users. When requested, a programmer-defined method such as GetVaryByCustomString( ) may analyze the associated cookie and decide the user status. If the user has signed in, the method may map "userstatus" to, for example, "login". The final cache key of the header's output would be "header;login".

To avoid redundant computation and transfer, the proxy may notify a content server about the content available at the proxy using cache keys. The content server may execute the same cache key generation algorithm to generate the cache keys again to skip redundant content generation.

In practice, a proxy may interact with many different content servers. The scope of a cache key may be limited to the content server that defines the CVL. For example, the cache key "/Category.aspx;cats;zh-zn" and "header;login" may be only applicable to requests sent to the content server for "http://www.petshop.net".

Figure 3:
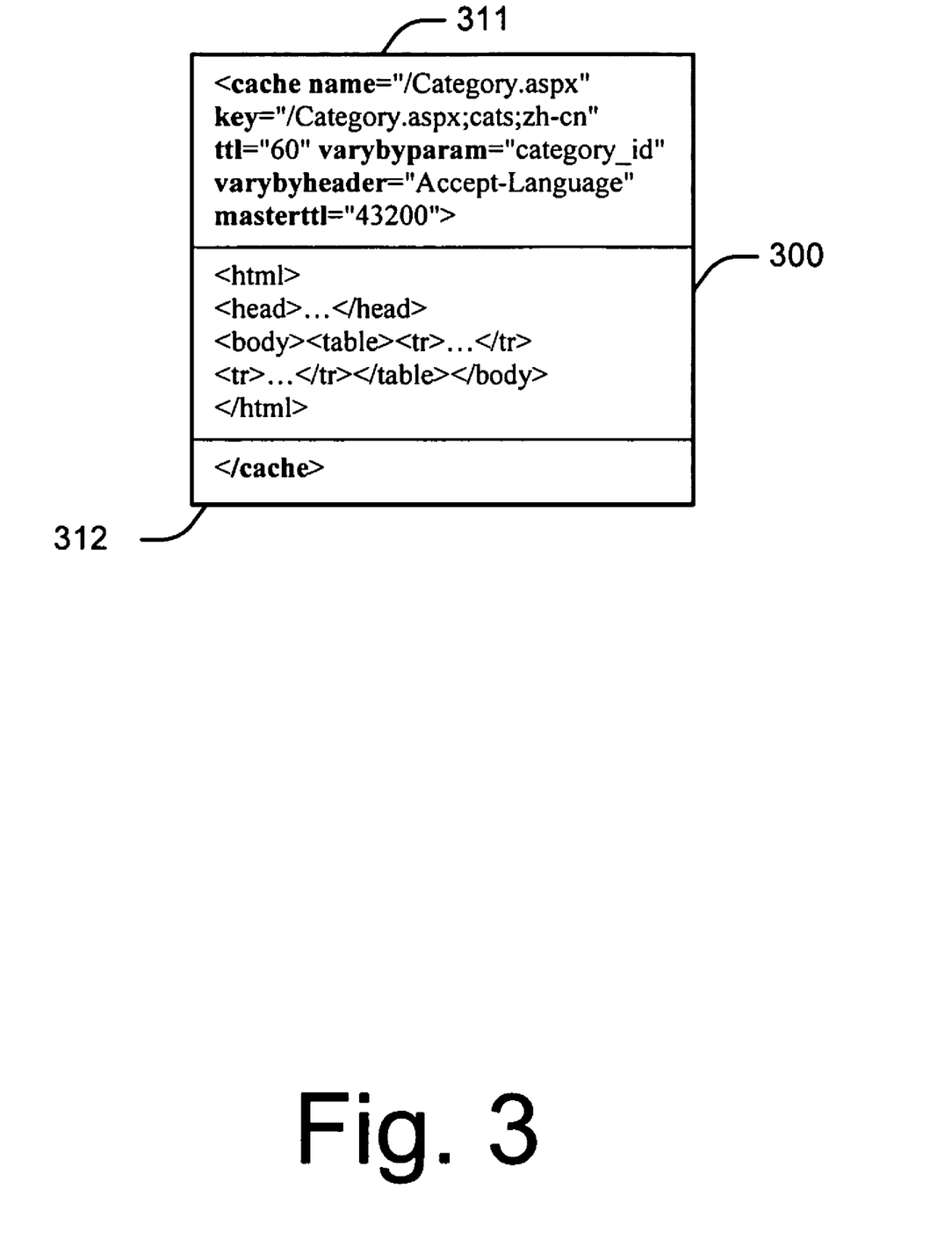
FIG. 3 shows an example web page with cache tags generated by a web server.

FIG. 3 shows an example web page 300 with cache tags 311-312 generated by a web server. Web page 300 is a typical output dynamically generated by a web server in response to a request for content. If the web server is part of a proxy augmentation system, the web server may tag web page 300 to facilitate caching by a proxy. As shown in FIG. 3, web page 300 may be tagged with cache tags 311-312. In one embodiment, cache tag 311 may include a name for identifying the cacheable item. Cache tag 311 may also include a key for identifying the cacheable item for processing subsequent requests issued by a proxy to the content server.

Cache tag 311 may further include information for identifying the conditions under which the cacheable item may be cached by a proxy. For example, cache tag 311 may include a time to live (ttl) parameter for identifying the length of time when the cacheable item will remain valid. A master ttl parameter may be included to identify the length of time when the program for generating the cacheable item will remain valid. Cache tag 311 may also include factors to identify when caching is appropriate so that a proxy may make such a determination based on the substance of a request from a requester. These factors may include a "VaryByParam" factor for identifying parameters associated with an input associated with the request, such as a query. A "VaryByHeader" factor may be included for identifying a HTTP header associated with the request. A "VaryByCustom" factor may be included for identifying a custom string in the request.

Web page 300 in FIG. 3 is associated with the request "http://www.petshop.net/Category.aspx?category_id=cats" from a requester. The accepted language associated with the request is "zh-cn". As shown in FIG. 3, the name identified in cache tag 311 is "/Category.aspx". The key is "/Category.aspx;cats;zh-cn". The ttl is 60 seconds and the masterttl is 43200 seconds. The VaryByParam factor is "category_id" and the VaryByHeader factor is "Accept-Language". Thus, cache tag 311 tells a proxy that it may cache web page 300, which has a lifetime of 60 seconds, and for requests of the same page that include the category of "cats" and the accepted language of "zh-cn".

Figure 4:
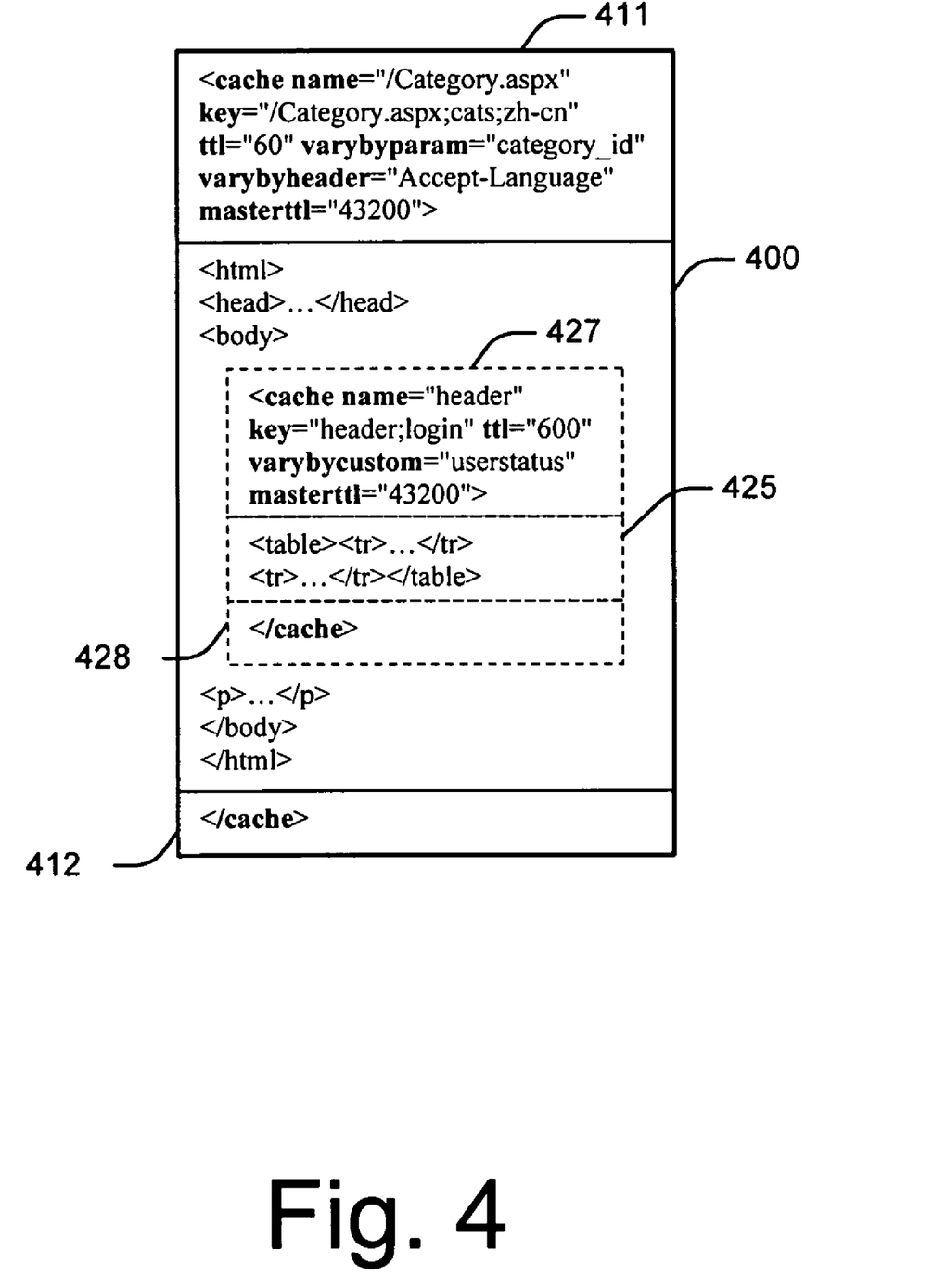
FIG. 4 shows an example web page with a fragment identified by cache tags.

FIG. 4 shows an example web page 400 with a fragment 425 identified by cache tags 427-428. Web page 400 and fragment 425 are typical output dynamically generated by a web server in response to a request for content. In this example, neither web page 400 nor fragment 425 is cached by the proxy that issued the request.

The web server may tag web page 400 and fragment 425 to facilitate caching by a proxy. As shown in FIG. 4, web page 400 is identified with cache tags 411-412, which, for ease of illustration, are the same as cache tags 311-312 in FIG. 3. Fragment 425 is identified with cache tags 427-428. Cache tag 427 may include information such as a name, a key, a ttl, a masterttl, request-based factors, and the like.

As shown in FIG. 4, the name identified in cache tag 427 is "header". The key is "header;login". The ttl is 600 seconds and the masterttl is 43200 seconds. The VaryByCustom factor is "userstatus". Thus, cache tag 427 tells a proxy that it may cache fragment 425, which has a lifetime of 600 seconds, and for requester having a userstatus of "login".

For a fragment with a CVL containing VaryByCustom, the fragment may depend on a special function, for example GetVaryByCustomString( ), to generate cache keys. A web application may notify the proxy of the function or a reference to it. For example, it may specify the location of a dynamic linking library by sending a new HTTP header "X-GetVaryByCustom" with the response X-GetVaryByCustom: library-url which exports the function:

```
string
GetVaryByCustomString(HttpRequest
req, string varyby);
```

Proxy may pass the complete request (e.g. the argument "req", including various header fields, cookies and body) and the value of VaryByCustom attribute associated with a fragment (e.g. the argument "varyby") to the function, which will return a unique string for identifying the version of the fragment. For example, besides generating the tagged output, the application may also add the following header to the response:

```
           X-GetVaryByCustom:
        http://www.petshop.net/varybycustom.dll
```

The proxy can download the DLL and import the function. Requesting pages/fragments with VaryByCustom attributes may cause cache miss when the DLL is not available, such as not being downloaded or being obsolete.

When receiving a subsequent request, if the necessary keys are not found in the cache (i.e. cache miss), the proxy may forward the request to the server. Otherwise, the proxy may compose the items corresponding to the keys together and return a complete response.

When receiving the request "http://www.petshop.net/Category.aspx?category_id=cats" again with "Accept-Language" header being "zh-cn", the proxy computes a key "/Category.aspx;cats;zh-cn" that may be found in the cache. Then, the proxy computes another key for the fragment for the page. If the user has not signed out, GetVaryByCustomString (Request,"userstatus") may return a string "login" according to the authentication cookie in the request. The key would be "header;login", which means both items hit the cache. The proxy may insert the content of "header" into that of "/Category.aspx" and the full output is returned. If the user has signed out and the cache does not contain the key "header;logout", the request may be forwarded to the content server.

Figure 5:
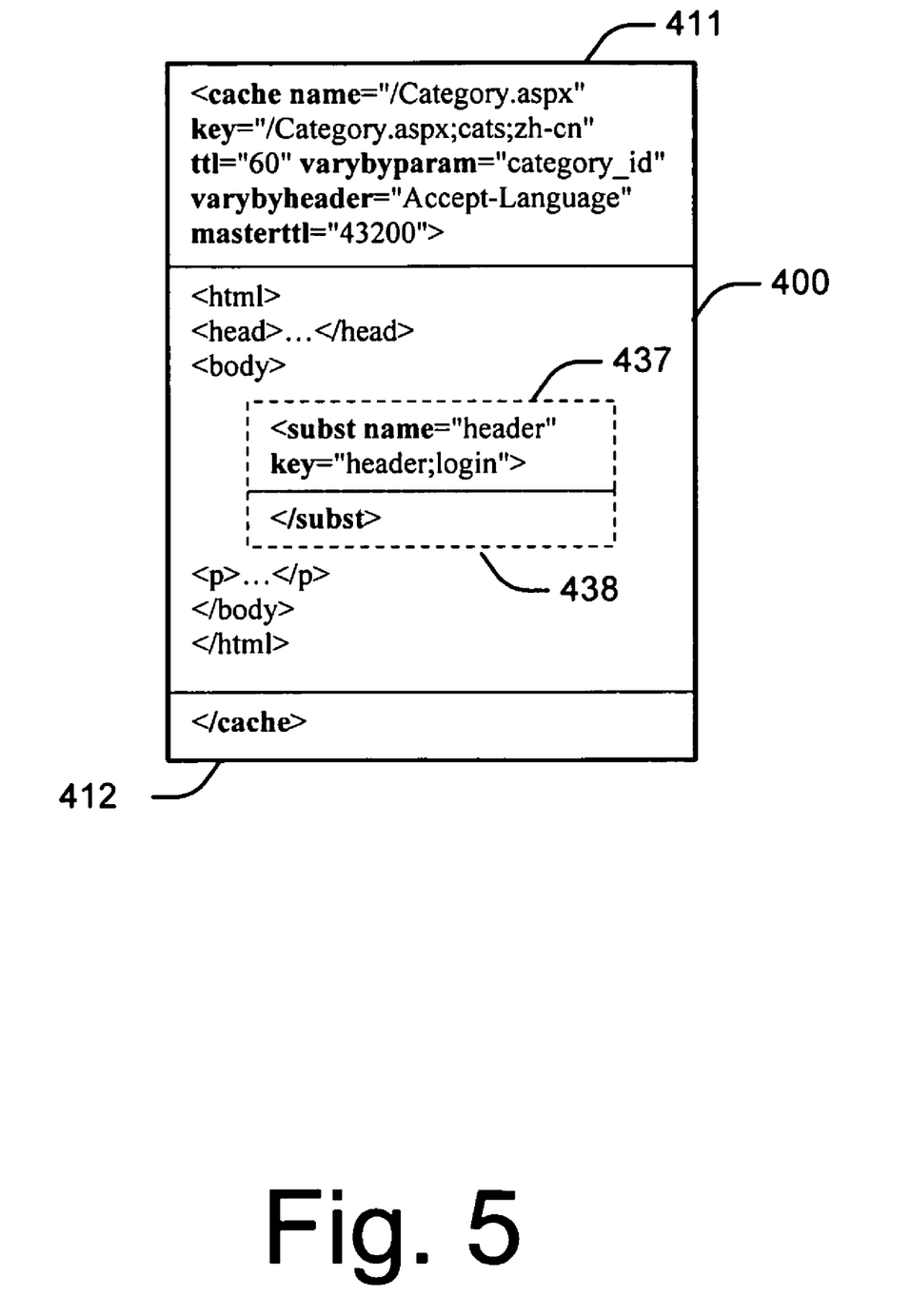
FIG. 5 shows the example web page in FIG. 4 where the fragment is cached by the proxy.

FIG. 5 shows the example web page 400 in FIG. 4 where the fragment 425 is cached by the proxy. The content server receives from the proxy a cache key associated with fragment 425 along with the content request. The cache key notifies the content server that fragment 425 is cached by the proxy and is not required to be generated. Thus, instead of generating fragment 425 and cache tags 427-428, the content server includes substitution tags 437-438 (i.e., place holders) in web page 400 to notify the proxy to insert the cached fragment into web page 400 at the location of substitution tags 437-438. Substitution tag 437 may include information about the cached fragment, such as a name and a key. As shown in FIG. 5, the name identified in substitution tag 437 is "header" and the key is "header;login". The proxy can use the information to insert the cached fragment into web page 400 and send the complete web page to the requester.

Figure 6:
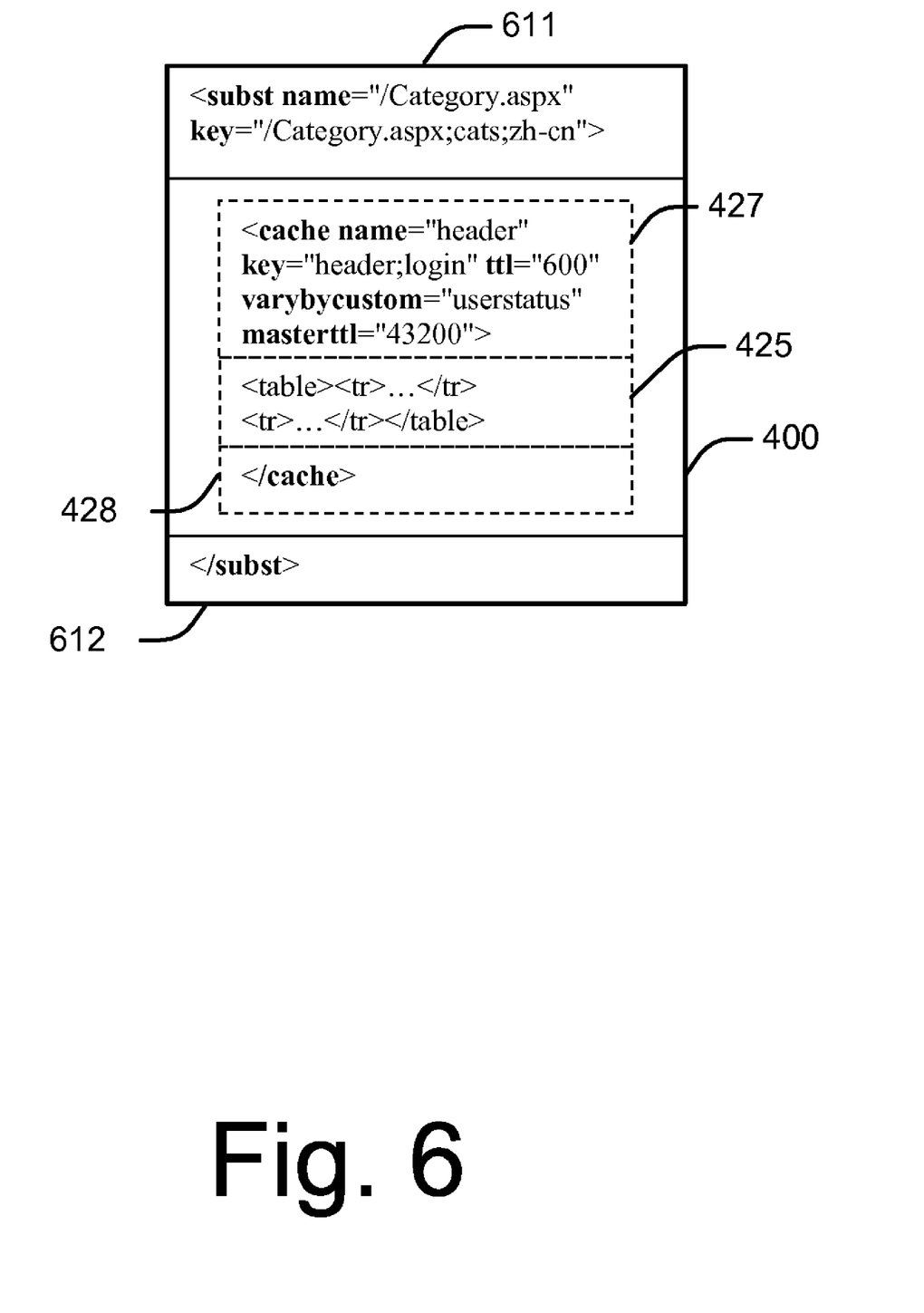
FIG. 6 shows the example web page in FIG. 4 where the web page is cached but the fragment is not cached.

FIG. 6 shows the example web page 400 in FIG. 4 where the web page 400 is cached but the fragment 425 is not cached. The content server receives from the proxy a cache key associated with web page 400 along with the content request. The cache key notifies the content server that web page 400 is cached by the proxy and is not required to be generated.

Instead of generating web page 400 and cache tags 411-412, the content server includes substitution tags 611-612 to notify the proxy to use the cached web page to respond to the content request from the requester. The content server also generates fragment 425, notifies the proxy to insert fragment 425 into the cached web page, and provides cache tags 427-428 so that the proxy can cache fragment 425.

Substitution tag 611 may include information about the cached web page, such as a name and a key. As shown in FIG. 6, the name identified in substitution tag 437 is "/Category.aspx" and the key is "/Category.aspx;cats;zh-cn".

The proxy augmentation system described herein can cache some parts of a response even when others are missed. A proxy may notify the content with a list of keys along with the request to indicate that the page/fragments with those keys have been cached so that the content server does not need to generate the content again. The notification can be done, for example, by appending a new HTTP header field, "X-CachedKeys", to the incoming request:

X-CachedKeys: cache-key1, cache-key2, . . .

If the server-side application finds that the cache key of the page or fragment is listed in the header, the application may skip the content generation process and put a place holder tag (e.g. <subst>) along with the name and the cache key. The verification may be processed by running the same key generation algorithm as in the proxy. Placeholder tags are intended to be substituted with the corresponding content from the proxy cache. For example, assume the proxy forwards the request "http://www.petshop.net/Category.aspx?category_id=cats" with "Accept-Language" header being "zh-cn", with a header:

X-CachedKeys: header;login

If the user has signed in, the application may verify that the cache key of the inner fragment "header" is in the request header and can mark the output as in FIG. 5. The pair of <subst>tag may be replaced with the cached fragment having the key "header;login" on the proxy.

If the request has the header:

```
            X-CachedKeys:
         /Category.aspx;cats;zh-cn
``` the output may be like FIG. 6.

On the proxy, the fragment "header" may be inserted into the cached output key "/Category.aspx;cats;zh-cn" in the position of the placeholder and a complete page is returned.

The content server is not required to skip the generation of the page or fragment even though the cache key is in the key list. The content server may also choose to include the actual output (with the <cache>tags). This flexibility allows a content server to effectively remove the caching capability of an untrusted proxy, and to proactively update both the content and CVL when necessary.

Figure 7:
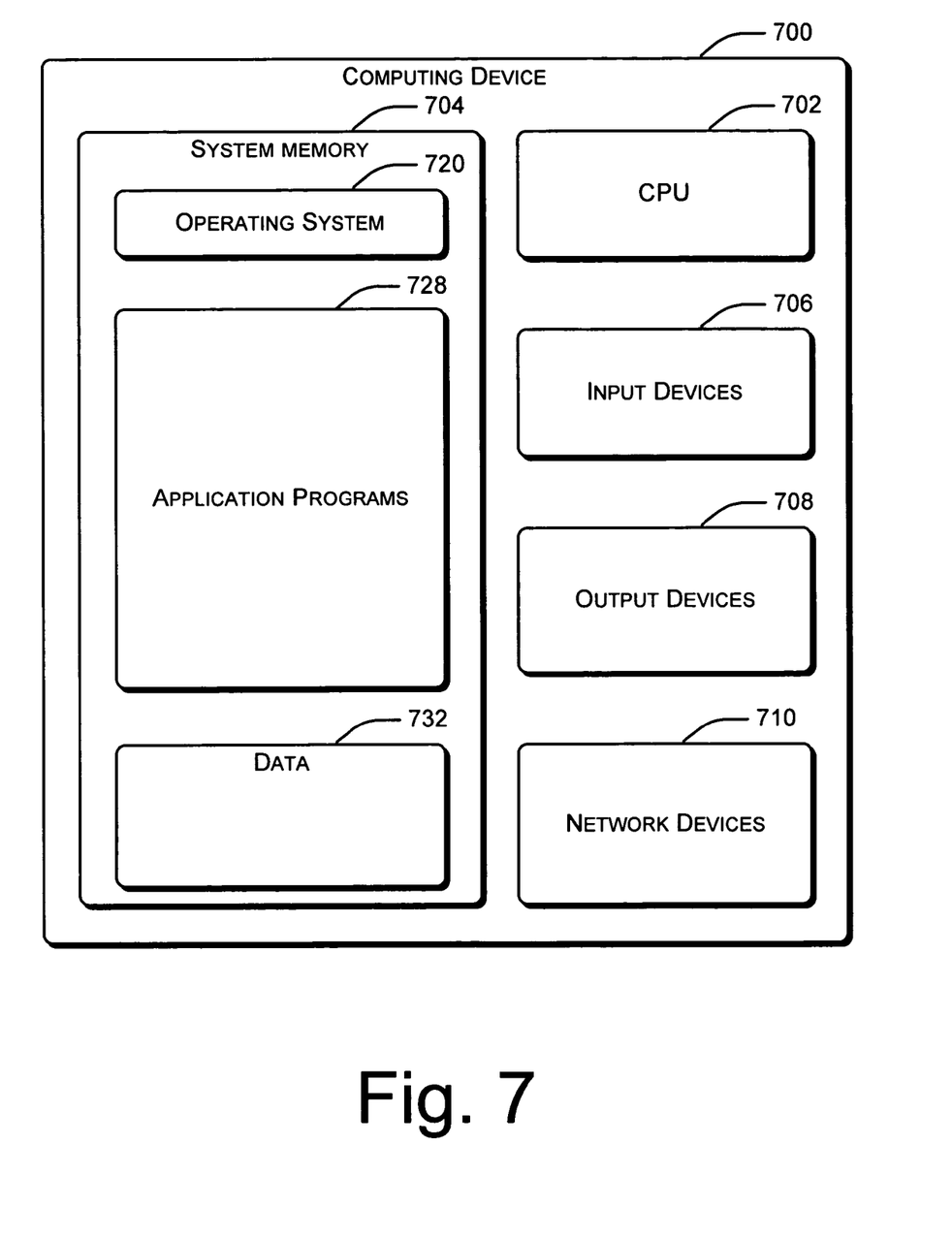
FIG. 7 illustrates an example computing device within which the described systems and methods can be fully or partially implemented.

FIG. 7 illustrates an example computing device 700 within which the described systems and methods can be either fully or partially implemented. Computing device 700 is only one example of a computing system and is not intended to suggest any limitation as to the scope of the use or functionality of the invention.

Computing device 700 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computing device 700 can include, but are not limited to, processor 702 (e.g., any of microprocessors, controllers, and the like), system memory 704, input devices 706, output devices 708, and network devices 710.

Computing device 700 typically includes a variety of computer-readable media. Such media can be any available media that is accessible by computing device 700 and includes both volatile and non-volatile media, removable and non-removable media. System memory 704 includes computer-readable media in the form of volatile memory, such as random access memory (RAM), and/or non-volatile memory, such as read only memory (ROM). A basic input/output system (BIOS), containing the basic routines that help to transfer information between elements within computing device 700, such as during start-up, is stored in system memory 704. System memory 704 typically contains data and/or program modules that are immediately accessible to and/or presently operated on by processor 702.

System memory 704 can also include other removable/ non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computing device 700. It is to be appreciated that other types of computer-readable media which can store data that is accessible by computing device 700, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computing device 700. Any number of program modules can be stored in system memory 704, including by way of example, an operating system 720, application programs 728, and data 732.

Computing device 700 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 700 via input devices 706 such as a keyboard and a pointing device (e.g., a "mouse"). Other input devices 706 may include a microphone, joystick, game pad, controller, satellite dish, serial port, scanner, touch screen, touch pads, key pads, and/or the like. Output devices 708 may include a CRT monitor, LCD screen, speakers, printers, and the like.

Computing device 700 may include network devices 710 for connecting to computer networks, such as local area network (LAN), wide area network (WAN), and the like.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method of communicating between two or more computing devices, the method comprising:
   receiving, by a first computing device, a request for content, from a requesting device, which includes a plurality of items, the plurality of items comprising an item cached by the first computing device and another item that is not cached by the first computing device;
   processing the request for content, by the first computing device, to determine which of the plurality of items within the request are cached by the first computing device, the determination comprising: computing one or more cache keys, wherein the cache keys are identifiers associated with the items within the request;
   upon determining that one or more of the requested items are not cached by the first computing device, then sending, by the first computing device to a second computing device, the request and one or more identifiers associated with the one or more cached items, respectively;
   receiving, by the second device, the request and the one or more identifiers associated with the one or more cached items;
   generating, by the second computing device, content based on the request and the one or more identifiers, wherein the one or more identifiers are used by the second computing device to determine content that is not to be included in the generated content, the request being used by the second computing device to determine content to be included in the generated content;
   sending, by the second computing device to the first computing device, the generated content;
   receiving, by the first computing device from the second computing device, content generated by the second computing device based on the request and the one or more identifiers;
   combining, by the first computing device, the cached item and the generated content, and
   sending, by the first computing device, the combined content to the requesting device.

2. The method of claim 1, wherein the cached item includes at least one of a web page and a fragment.

3. The method of claim 1, wherein the one or more identifiers includes a cache key.

4. The method of claim 1, wherein the generated content includes a place holder to represent the cached item.

5. The method of claim 1, wherein the generated content includes at least one cacheable item and metadata associated with the cacheable item, wherein the metadata enables the first computing device to cache the cacheable item.

6. The method of claim 5, further comprising deleting, by the first computing device, the metadata before sending the combined content to the destination.

7. The method of claim 5, further comprising:
   caching, by the first computing device, the cacheable item; and
   maintaining, by the first computing device, the cacheable item in accordance with the metadata.

8. The method of claim 5, further comprising:
   implementing, by the first computing device, a policy for caching the cacheable item based on the metadata.

9. The method of claim 5, wherein the metadata includes at least one of a name, a key, and information for identifying conditions under which the cacheable item may be cached.

10. The method of claim 1, wherein the generated content includes multiple items.

11. The method of claim 1, wherein the first computing device is a proxy and the second computing device is a content server.

12. A system comprising:
a proxy server configured to receive and process a request for content, wherein the request includes a plurality of items and wherein at least one of the plurality of items is cached by the proxy server, the proxy server further having multiple items that are cached therein, the proxy server being further configured to determine which of the plurality of cached items are cached in the proxy by computing one or more cache keys, wherein the cache keys are identifiers associated with the items of the request, and being further configured to forward the request along with identifiers associated with the cached items; and
a content server configured to receive and inspect the request from the proxy server and dynamically generate content specified in the request from the proxy server based on the request and the identifiers included with the request, and based on a determination made by the inspection and wherein, the dynamically generated content excludes content of the request that relates to the identifiers associated with the cached items, the dynamically generated content further including content of the request not excluded by the identifiers, and the dynamically generated content having information for the proxy server to combine the dynamically generated content with the cached items for processing the request and wherein the content server is further configured to send the generated content to the proxy server;
wherein the proxy server and the content server are comprised of at least one computing device.

13. The system of claim 12, wherein the dynamically generated content includes multiple items that are not cached by the proxy server.

14. The system of claim 13, wherein the items include at least one of a web page and a fragment.

15. The system of claim 12, wherein the information in the content includes place holders for inserting the items cached by the proxy server.

16. The system of claim 15, wherein the place holders include at least one substitution tag.

17. The system of claim 15, wherein the identifiers include cache keys and each place holder is identified with at least one of the cache keys.

18. The system of claim 12, wherein the content server is further configured to generate and send cacheable items and metadata associated with the cacheable item in response to the request, and wherein the proxy server is configured to cache the cacheable items in a computer-readable media and to use the cacheable items to process subsequent requests based on the metadata.

19. The system of claim 18, wherein the metadata includes at least one cache tag.

20. The system of claim 19, wherein the cache tag includes a key.

21. A system comprising:
a proxy server configured to:
process a request for content, the proxy server having first items identified in the request for content that are cached and second items identified in the request for content that are not cached,
generate a cache key for each of the first items that are cached,
add each generated cache key to the request for content, and
forward the request including the added cache keys; and
a content server configured to:
dynamically generate content specified in the request from the proxy server based on the request and each generated cache key included with the request, the dynamically generated content excluding content of the request that relates to the generated cache keys included with the request, and the dynamically generated content including content of the request not excluded by the generated cache keys,
determine whether any portion of the dynamically generated content is cacheable,
determine conditions that are appropriate for the portion of the dynamically generated content to be cached,
include metadata with the dynamically generated content to identify the portion of the dynamically generated content that is cacheable content, and
send the dynamically generated content with the metadata to the proxy server;
wherein the proxy server and the content server are comprised of at least one computing device.

22. The system of claim 21, wherein the dynamically generated content includes information for the proxy server to combine the dynamically generated content with the first items cached by the proxy server.

* * * * *